United States Patent
Ivanchenko et al.

(10) Patent No.: US 9,055,384 B2
(45) Date of Patent: Jun. 9, 2015

(54) ADAPTIVE THRESHOLDING FOR IMAGE RECOGNITION

(71) Applicant: Amazon Technologies, Inc., Reno, NV (US)

(72) Inventors: Volodymyr V. Ivanchenko, Mountain View, CA (US); Geoffrey Scott Heller, Seattle, WA (US); Richard Howard Suplee, III, Bainbridge Island, WA (US); Daniel Bibireata, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 14/046,814

(22) Filed: Oct. 4, 2013

(65) Prior Publication Data

US 2014/0187223 A1    Jul. 3, 2014

Related U.S. Application Data

(63) Continuation of application No. 13/491,398, filed on Jun. 7, 2012, now Pat. No. 8,606,011.

(51) Int. Cl.
*G06K 9/34* (2006.01)
*H04W 4/00* (2009.01)
*G06K 9/32* (2006.01)

(52) U.S. Cl.
CPC ............. *H04W 4/001* (2013.01); *G06K 9/3258* (2013.01); *G06K 9/3283* (2013.01)

(58) Field of Classification Search
USPC ......... 382/176, 173, 190, 141, 194, 199, 305; 1/1; 345/172, 173; 379/88.01, 88.14, 379/88.18, 265.09; 707/E17.008, 999.03; 704/231; 715/212, 809
See application file for complete search history.

(56) References Cited

U.S. PATENT DOCUMENTS

| | | | |
|---|---|---|---|
| 4,876,457 A | 10/1989 | Bose | |
| 5,717,781 A | 2/1998 | Ebel et al. | |
| 6,941,016 B1 | 9/2005 | Wagman et al. | |
| 7,003,161 B2 | 2/2006 | Tessadro | |
| 7,137,072 B2 * | 11/2006 | Bauer et al. | 715/809 |

(Continued)

OTHER PUBLICATIONS

"Notice of Allowance dated Jul. 29, 2013," U.S. Appl. No. 13/491,398, 10 pages.

(Continued)

*Primary Examiner* — Ahn Do
(74) *Attorney, Agent, or Firm* — Novak Druce Connolly Bove + Quigg LLP

(57) ABSTRACT

Various approaches for providing textual information to an application, system, or service are disclosed. In particular, various embodiments enable a user to capture an image with a camera of a portable computing device. The computing device is capable of taking the image and processing it to recognize, identify, and/or isolate the text in order to forward the text to an application or function. The application or function can then utilize the text to perform an action in substantially real-time. The text may include an email, phone number, URL, an address, and the like and the application or function may be dialing the phone number, navigating to the URL, opening an address book to save contact information, displaying a map to show the address, and so on. Adaptive thresholding can be used to account for variations across an image, in order to improve the accuracy and efficiency of text recognition processes.

19 Claims, 9 Drawing Sheets

(56) References Cited

U.S. PATENT DOCUMENTS

| | | | |
|---|---|---|---|
| 7,587,308 B2* | 9/2009 | Kasravi et al. | 704/9 |
| 7,996,571 B2* | 8/2011 | Salokannel | 710/3 |
| 8,249,347 B1* | 8/2012 | Ramkumar et al. | 382/176 |
| 8,290,215 B2* | 10/2012 | Nielsen et al. | 382/109 |
| 8,582,727 B2* | 11/2013 | Saylor et al. | 379/88.14 |
| 8,644,610 B1* | 2/2014 | Ramkumar et al. | 382/176 |
| 8,654,934 B2* | 2/2014 | Saylor et al. | 379/88.01 |

OTHER PUBLICATIONS

"International Search Report and Written Opinion dated Jan. 31, 2014," International Application No. PCT/US20131044182, 15 pages.

* cited by examiner

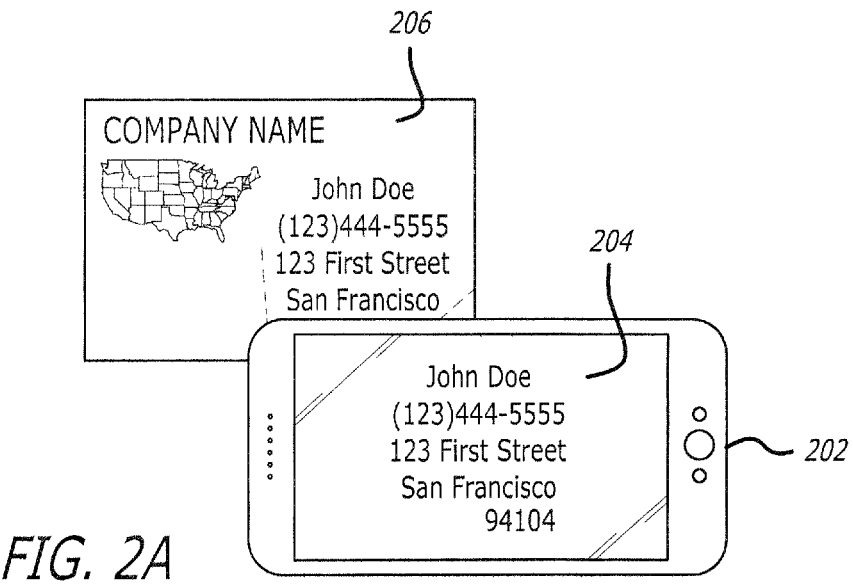
FIG. 2A
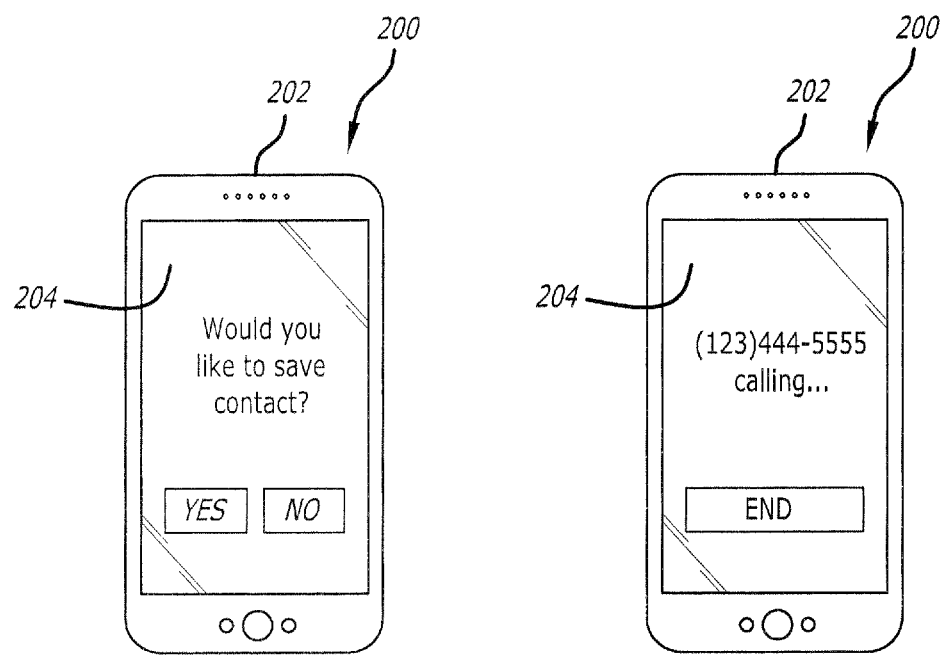
FIG. 2B
FIG. 2C

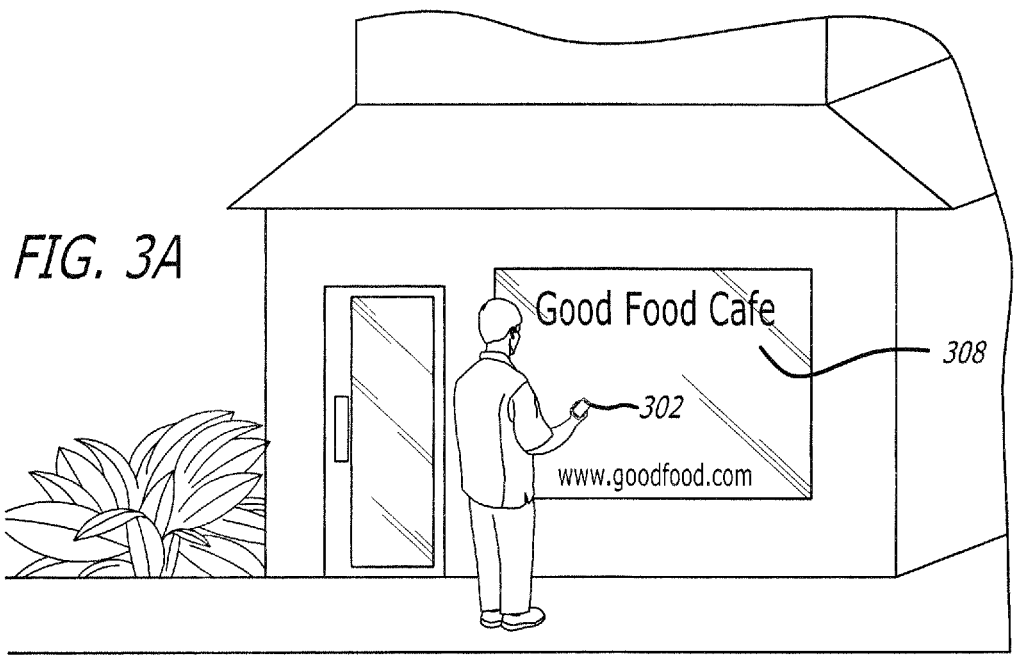
FIG. 3A
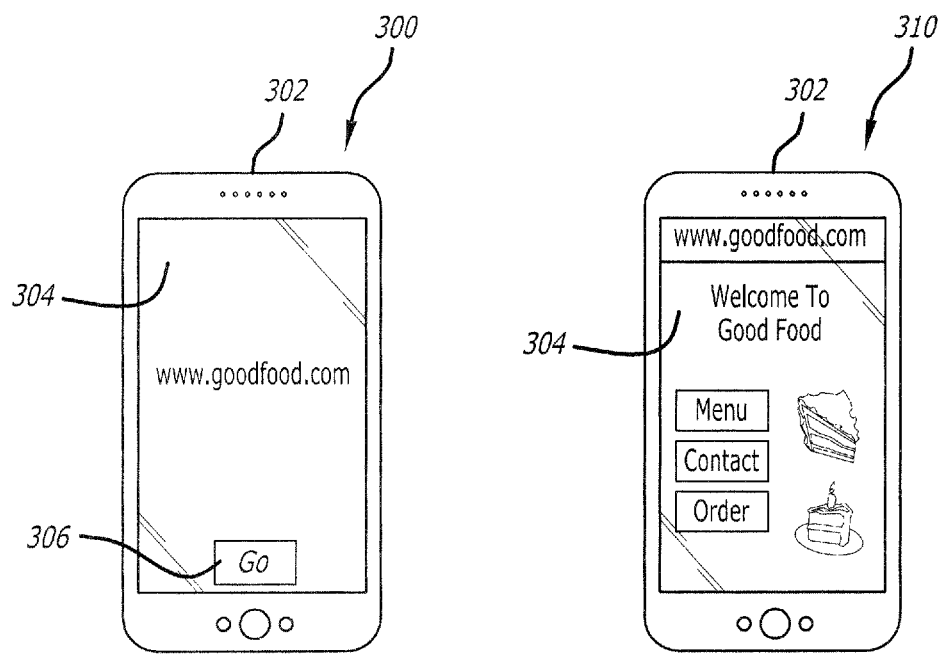
FIG. 3B
FIG. 3C

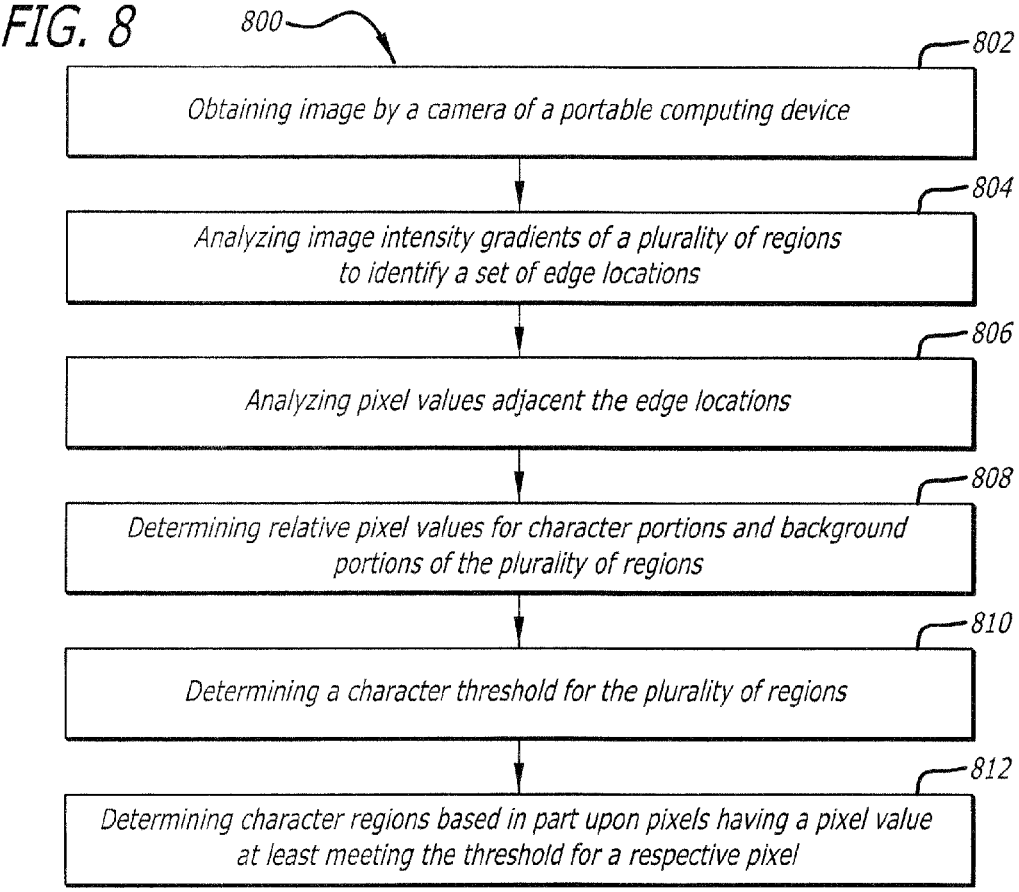

FIG. 8

800 → 802 Obtaining image by a camera of a portable computing device

804 Analyzing image intensity gradients of a plurality of regions to identify a set of edge locations 806 Analyzing pixel values adjacent the edge locations 808 Determining relative pixel values for character portions and background portions of the plurality of regions 810 Determining a character threshold for the plurality of regions 812 Determining character regions based in part upon pixels having a pixel value at least meeting the threshold for a respective pixel

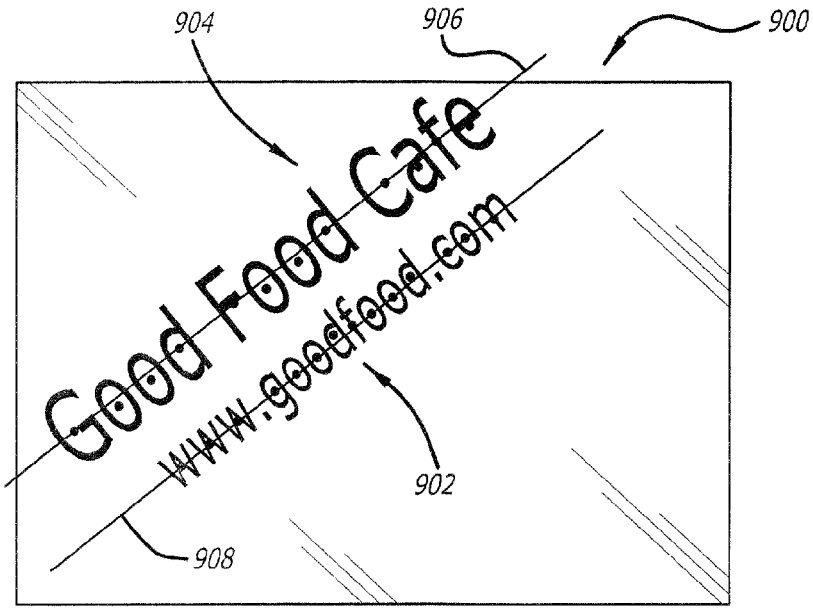

FIG. 9

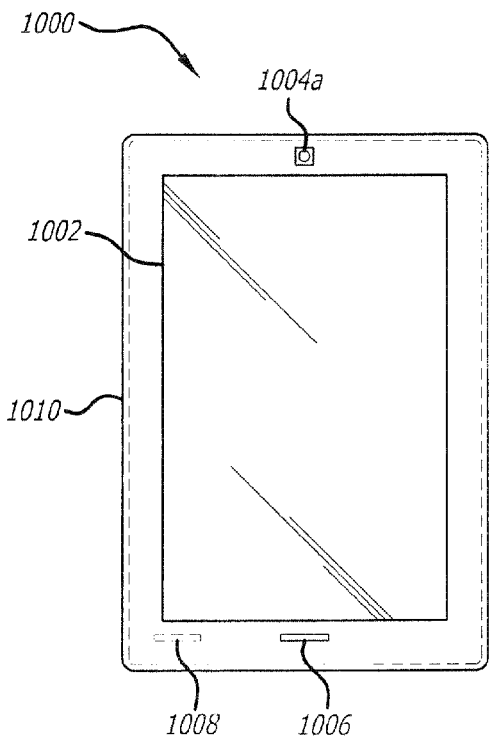
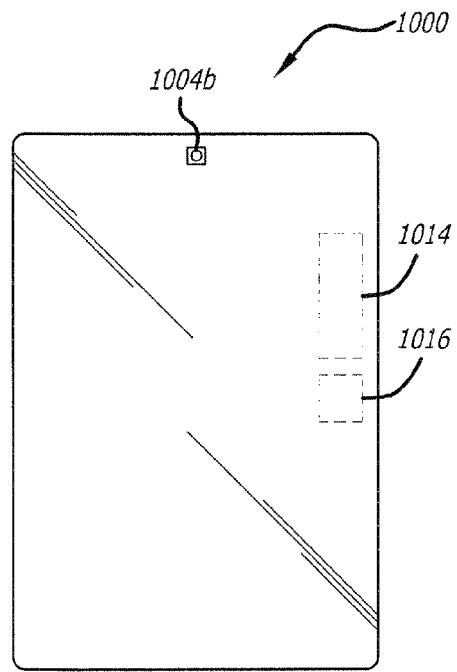
FIG. 10A  FIG. 10B
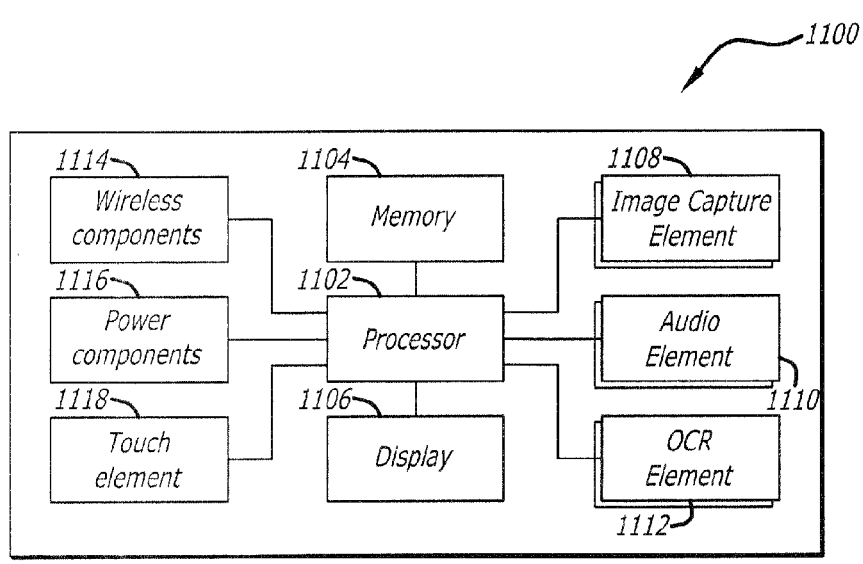
FIG. 11

ADAPTIVE THRESHOLDING FOR IMAGE RECOGNITION

CROSS-REFERENCES TO RELATED APPLICATIONS

This application is a continuation of allowed U.S. application Ser. No. 13/491,398, entitled "Adaptive Thresholding For Image Recognition," filed Jun. 7, 2012; of which the full disclosure of these applications is incorporated herein by reference for all purposes.

BACKGROUND

As people are increasingly utilizing a variety of computing devices, including portable devices such as tablet computers and smart phones, it can be advantageous to adapt the ways in which people interact with these devices. Users are accustomed to manually inputting phone numbers to make a phone call, manually typing an email address to send an email, manually typing a web address into a web browser to view a web page, and the like. These tasks are often tedious and time consuming. Various methods to save users time have been offered on various devices such as assigning a phone number to a favorites list and bookmarking a Web address. As technology evolves and as the features and services offered on portable computing devices evolve and expand, the ways shortcuts and other time saving methods are provided is changing.

BRIEF DESCRIPTION OF THE DRAWINGS

Various embodiments in accordance with the present disclosure will be described with reference to the drawings, in which:

FIGS. 2A, 2B, and 2C illustrate an example implementation wherein a user holding a portable computing device provides a phone number to a phone application, in accordance with one embodiment;

FIGS. 3A, 3B, and 3C illustrate an example implementation wherein a user holding a portable computing device provides text to a browser, in accordance with one embodiment;

FIG. 8 illustrates an example process for text detection, in accordance with various embodiments;

FIG. 9 illustrates an example implementation of preprocessing an image for text detection, in accordance with various embodiments;

FIGS. 10A and 10B illustrate front and back view examples of a computing device that can be utilized in accordance with various embodiments;

FIG. 11 illustrates a component level example of a computing device that can be utilized in accordance with various embodiments.

DETAILED DESCRIPTION

Figure 1A:
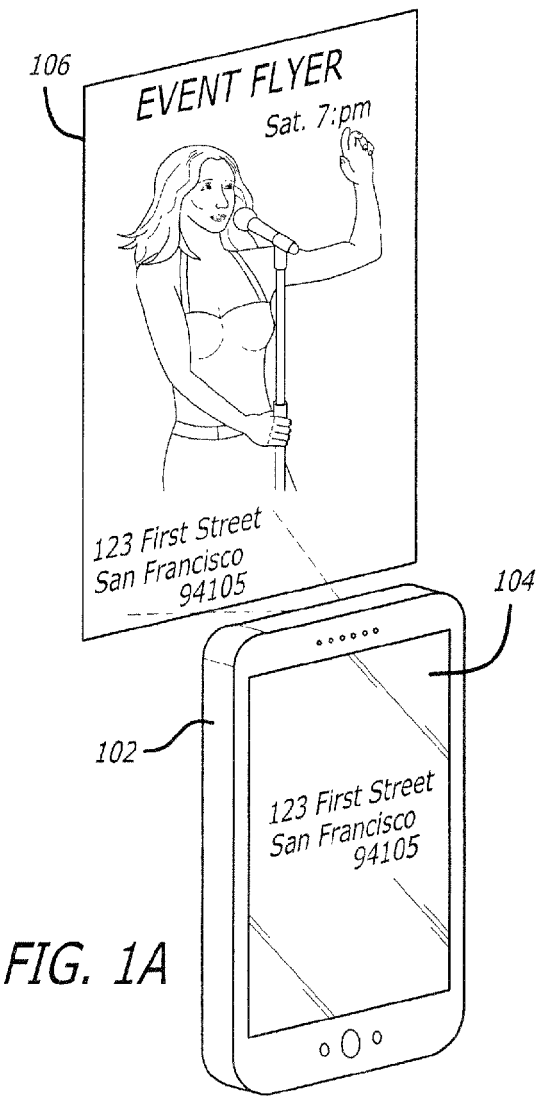
FIGS. 1A, 1B, and 1C illustrate an example implementation wherein a user holding a portable computing device provides text to a map application, in accordance with one embodiment.

Systems and methods in accordance with various embodiments of the present disclosure may overcome one or more of the aforementioned and other deficiencies experienced in conventional approaches for providing textual information to an application, system, or service. In particular, various embodiments enable a portable computing device to perform tasks such as to obtain image information that includes text, locate the text in the image, identify a type or pattern of the text (e.g. an email, phone number, URL etc.), determine a function or application (e.g. calling a number, opening an internet browser, etc.) associated with the text, and/or perform the function or application associated with the text. At least some of these tasks can be performed using at least one resource available across a network as well.

Various embodiments enable a user to point a camera at an object that includes text, in order to capture an image of that object. The camera can be integrated with a portable computing device that is capable of taking the image and processing the image (or providing the image for processing) to recognize, identify, and/or isolate the text in order to send the text to an application or function. The application or function can then utilize the text to perform an action in substantially real-time. For example, a user walking down a street could see an advertisement that includes a phone number. The user can, using the teachings described herein, call the phone number by pointing a camera of a smartphone, for example, at the number to have the number entered into a phone application without manually entering the number. In one instance, the device could enter the number from the image and wait for a user direction to initiate the call or, in another instance, the call could be automatically placed by the device. This example can be extended to entering Web addresses or URLs in a web browser, email addresses for opening a new message window, physical addresses for opening a map application to display directions, and various other actionable data types.

Various embodiments can detect and recognize text in an image using approaches that are robust to variations in lighting, shading, contrast, or other such aspects. For example, a camera might capture an image of a sign that is partially covered in shadow. Due at least in part to the shadowing, the separation between color values of text characters and background regions will differ between the shadowed regions and the non-shadowed regions. Further, there can be variations in the shadowing that can also affect the separation. Thus, a single threshold for the image can be insufficient to separate background regions from text regions based on aspects such as pixel color value. Approaches described herein can analyze separation values at various locations across an image, in order to determine an appropriate threshold for each location. The thresholds can thus vary across the image and adapt to changes in lighting conditions, contrast, etc. Such an approach can improve the accuracy of text detection in some situations, and can at least increase the speed and efficiency of text recognition processes in other situations.

Various other applications, processes and uses are presented below with respect to the various embodiments.

Figure 1B:
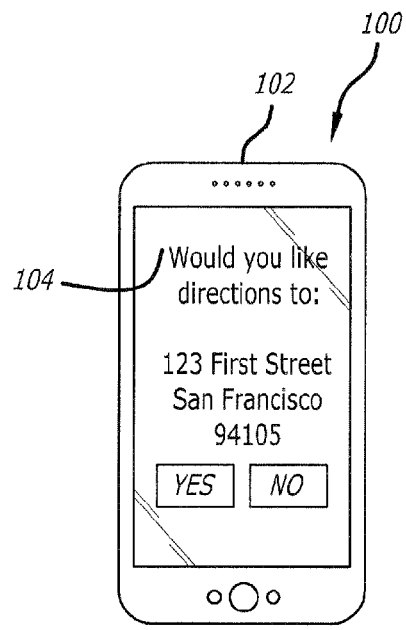
Figure 1C:
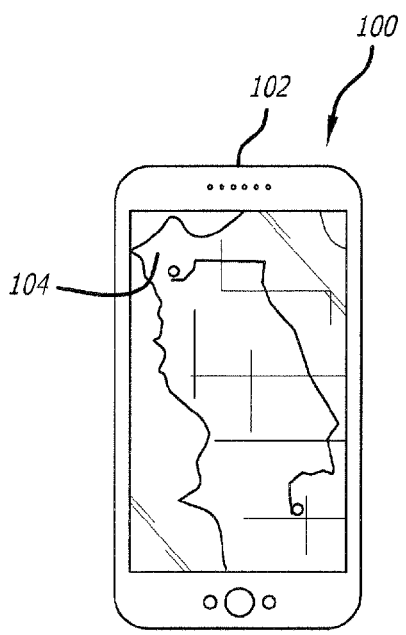

FIGS. 1A-1C illustrate example situation 100 showing a user holding a portable computing device 102 above an event flyer 106. The event flyer 106 contains a physical address of the event location and, in this example, the user is seeking directions to that location. In order to obtain directions, the user can point a camera of the device 102 at a portion of the flyer containing the address to capture or obtain an image of the address, as viewable though the screen 104 of FIG. 1A. In one embodiment, upon obtaining an image and/or identifying one or more portions of the image having properties that indicate the presence of text, an application on the device 102 automatically runs an optical character recognizing (OCR) algorithm to recognize the imaged text of the flyer. The OCR algorithm may, in various embodiments, include a machine vision algorithm and other image preprocessing algorithms making use of various techniques. The OCR algorithm runs to identify and analyze one or more regions of an image that may include strings of text or characters. Any identified strings are analyzed to further identify patterns that would indicate the presence of interested data objects or types, such as email addresses, URL/web addresses, phone numbers, and the like. Referring back to FIG. 1B, a string indicating the presence of a physical address has been identified. In this example, a user is prompted to confirm the user's intent to perform a specific action, or run a predetermined routine or workflow, associated with a physical address. In this example, the predetermined routine causes a map application to be opened and directions to the address displayed. In this example, the user can first confirm an intent by pressing a 'yes' button whereby a map with directions to the event are displayed on the screen 104 of the portable computing device 102 as shown in FIG. 1C.

FIGS. 2A-2C illustrate an example situation 200 showing a user holding a portable computing device 202 above a business card 206, shown in FIG. 2A. As described above, the device 202, or service in communication with the device, locates text in a captured image of a business card, identifies the type or pattern of the text (e.g. an email address, phone number, URL etc.), determines a function or application (e.g. calling a number, opening an internet browser, etc.) associated with the type of text, and sends the application or function at least a relevant portion of the located text to perform an operation therewith. In this example, the business card 206 contains multiple data objects of interest, which are a phone number, an email, and a physical address. In one instance, a user could assign priorities to various functions or applications, in the event multiple data types are identified, for one data type to take priority of another. In another instance, the device 202 could prompt the user with a choice between, or among, various available functions or applications.

Referring to FIG. 2B, a device identifying two or more data objects could prompt the user with an option to launch an address book application for saving the objects as contact information. Alternatively, the user could be prompted via the display 204 with a message such as "Press 1 to dial the number, 2 to find directions, 3 to email, or 4 to save contact." In one example, the text of the data types could be automatically populated into respective data field types. Further, in various embodiments, the device 202 could be programmed, preloaded, or include a downloadable plug-in to recognize objects like business cards and associate a default workflow therewith, which, in some instances, may be to save the data as a contact. In the example of FIGS. 2A-2C, the user is prompted, as shown in FIG. 2B, to save the contact associated with the business card 206. In this case, however, the user wants to call the phone number on the business card and selects 'No.' In one instance, the device 202 could prompt the user again with individual options or the user could have set an application priority to automatically run a predetermined routine or execute a predetermined operation. Referring now to FIG. 2C, the user has either selected the option to call the phone number, or the user has assigned dialing a phone number as the priority operation, and the device 202 is shown calling the number.

FIGS. 3A-3C illustrate an example situation 300 showing a user pointing a portable computing device 302 toward a window 308. The window 308, in this example, has a web address printed thereon, shown in FIG. 3A. In accordance with various embodiments, a user walking down a street could point or aim a camera associated with device 302 at the web address as a shortcut to navigating thereto, instead of manually typing the address into a web browser. In this example, a user must select an icon 306 on the screen 304, or provide another such input, in order to manually capture the image of the window containing the web address. In the previous examples, the camera could have included a gyroscope, accelerometer, light sensor, or combination thereof, for example, to predict the user's intent to capture an image and initiate the routine, or execute the operation, associate with a particular data object. In this example, the user holds up the device 302, aims the camera at the window 308, and presses the icon 306 to capture the image of the web address. Then, as described above, the device or service runs through the OCR algorithm to locate text in the image, identifying the type or pattern of in the text, a web address in this example, launches a browser application, as shown in FIG. 3B, and navigates the user to the web address 310 of a restaurant, as shown in FIG. 3C.

Figure 4:
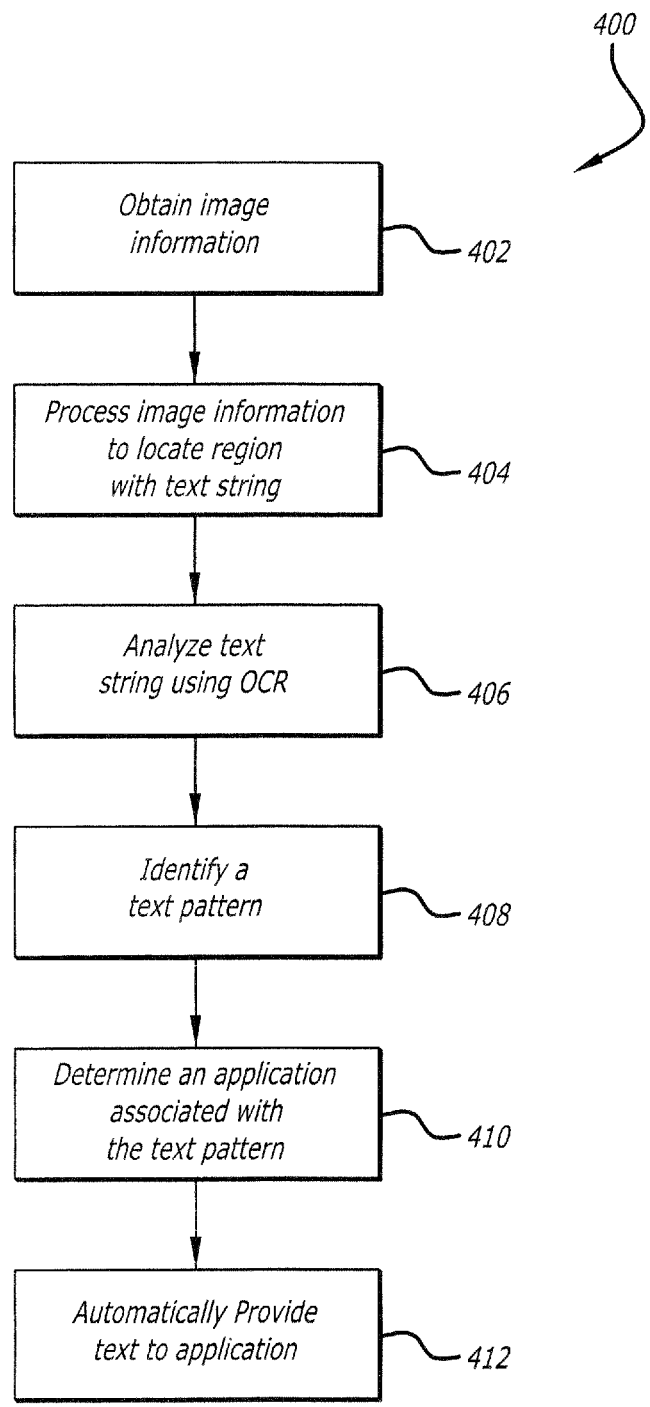
FIG. 4 illustrates an example process for providing text to an application on a portable computing device, in accordance with various embodiments.

FIG. 4 illustrates an example process 400 for providing textual information to an application or function on a computing device in accordance with various embodiments. It should be understood that, for any process discussed herein, there can be additional, fewer, or alternative steps performed in similar or alternative orders, or in parallel, within the scope of the various embodiments unless otherwise stated. In this example, an image or image information (e.g., a video stream) is obtained 402. In various embodiments, the image or image information is obtained from a camera application of the portable computing device. In one instance, hovering the device over an object facing the camera will cause the camera to automatically capture at least one image or record a sequence of images. In another instance, the camera requires input from a user in order to capture the image, such as by the user selecting an icon on a touch screen, for example. The obtained image information is processed to locate at least one region having properties of a string of text or characters 404. In one instance, the processing is automatically initiated upon receiving image information. The camera can also be in a continuous image capturing mode. This can, however, be energy intensive, so a user may select various options or circumstances in which to have the device continually run in an image capturing and processing mode or when to have it disabled. For example, a setting could be selected where the continuous capturing and processing mode is automatically turned off when the battery is drained to a particular level. In this example, the text string is analyzed using an optical character recognition algorithm to recognize text in the text string 406. The OCR algorithm can include a machine vision algorithm and other image preprocessing techniques or algorithms. A text pattern (e.g. an email, phone number, URL etc.) is identified that corresponds to the recognized text 408. In this example, an application associated with the text pattern determined 410 and the recognized text is automatically provided to the application 412.

In one embodiment, a device may not recognize a data object of interest within a portion of text. In this case, the device could be programmed to offer a user various other options such as performing a web search or to search for a plug-in to recognize a unrecognized pattern. The user could be prompted to select a portion of the text to copy/paste the text into an email, notepad, or various other applications.

Figure 5:
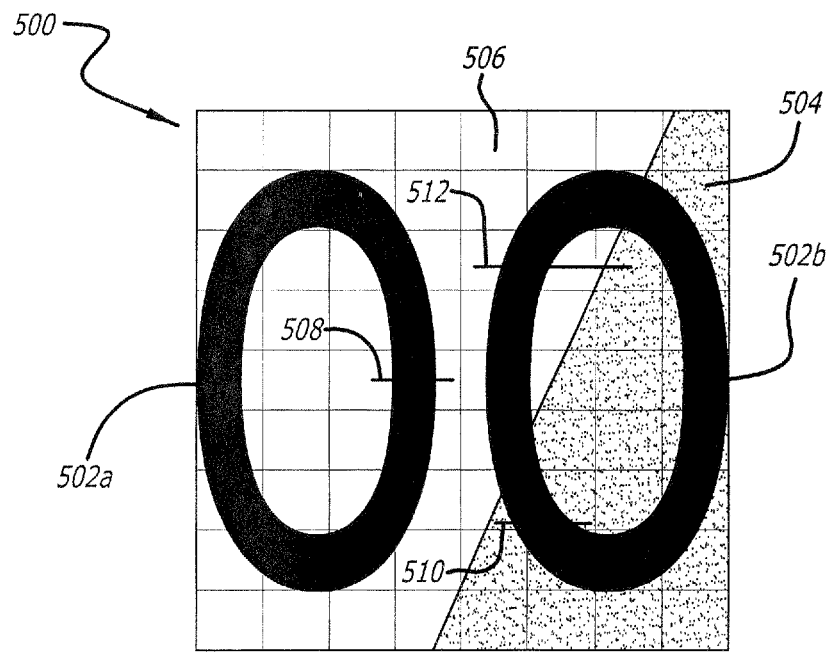
FIG. 5 illustrates an example implementation of preprocessing an image for text detection, in accordance with various embodiments.

Various embodiments provide approaches to detecting and recognizing text in an image that are robust to variations in lighting, shading, contrast, and other such aspects. For example, FIG. 5 illustrates an example of a portion of an image 500 that can be captured using a camera of a computing device (or otherwise obtained). The example image portion 500 corresponds to a portion of the "Good Food Café" URL described above with respect to FIGS. 3A-3C. The image portion 500 illustrated includes two examples of the letter "o" 502a and 502b. As illustrated, the captured image portion includes a shadow region 504 over a portion of one of the letters 502b. For this example the portion 500 will be assumed to be a grayscale image, although the image could also be a color image, or a color image that has been converted to a grayscale image, among other such options. If the region is logically divided into a plurality of segments 506, it can be seen that the segments outside the shadow region and without a portion of a text character are substantially white (e.g., with a color value of 1, for example), where black text characters would have a color value of 0 (among other such options). In a segment within the shadow region 504, however, the background color does not appear to be white, but appears to be gray. Thus, in one example, a black value might stay substantially the same (e.g., 0) at all regions, but the background color values might change substantially between the non-shaded region (e.g., a color value of 0) and the shaded region 504 (e.g., a color value of 0.5). Using a conventional thresholding approach, where a single threshold might be used, a threshold of 0.4 would be sufficient for the non-shaded regions, but would cause all the segments in the shaded region to be determined to include background, as all the color values are above the cutoff threshold, such that a portion of the information would be lost.

Accordingly, approaches in accordance with various embodiments can analyze some or all of a plurality of segments or regions across an image, in order to attempt to determine local thresholds that are appropriate for those segments or regions. Such an adaptive approach can provide for improved text detection in images with significant lighting, coloring, shading, or other such variations. As discussed, one such approach can segment an image (or image portion determined to likely include text, for example) into a plurality of segments, although in other approaches a plurality of regions of locations across an image can alternatively be selected, among other such options.

Figure 6:
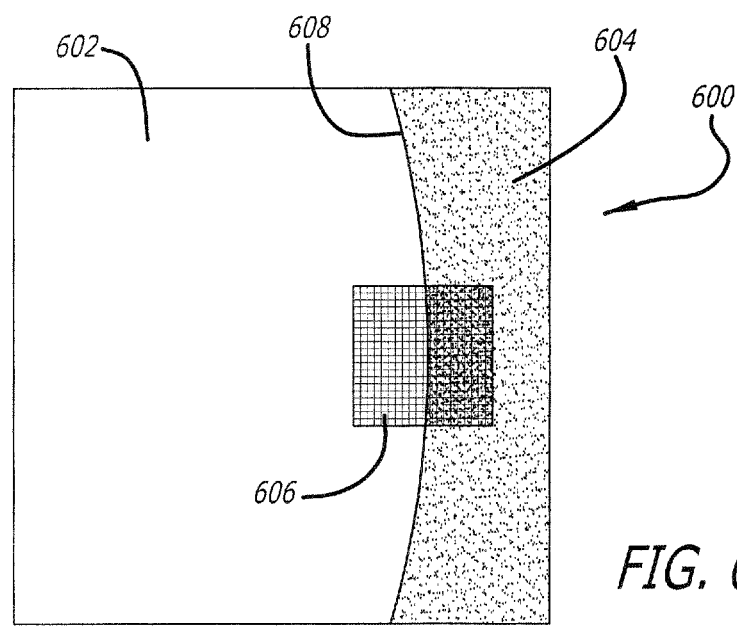
FIG. 6 illustrates an example enlarged view of a pixel region, in accordance with various embodiments.

In an example where the image is segmented into a plurality of segments, each segment can be analyzed to attempt to determine whether that segment includes an edge region that might correspond to a character or text. For example, consider the segment 508 which is illustrated in an enlarged view 600 in FIG. 6. The segment includes two main portions, a background portion 602 and a character portion 604 that corresponds to a portion of the letter "o". There is a distinct edge boundary 608 in this example between the background portion 602 and character portion 604, although due to antialiasing, blur, and other such issues the transition often will not be as discrete. A set of gradients of the image segment can be analyzed, where the gradient represents an amount of change in color value between pixels 606 of the segment. In this example, there would be a set of large gradient values near the transition between the regions. Accordingly, this segment can be selected as a candidate to be analyzed for including a text portion. In at least some embodiments, a gradient threshold can be set to determine how much change is necessary to designate the segment as a text candidate. As discussed, the image can be converted to a grayscale or monochromatic image before the analysis in order to assist with the determination.

For each segment or region determined to include an edge location, a sampling of color values for various pixels (or "pixel values") can be determined where that sampling includes pixels on each side of the edge boundary. For example, a selection of a number of pixels on a first side of the edge and a selection of a number of pixels (the same or different) on the other side of the edge can be determined. This can include, for example, a 20×20 pixel array centered about the edge region, a random selection within a given distance of the edge, etc. The number of pixels, distance from the edge region, and other such aspects can vary between embodiments. The pixel values can be analyzed to attempt to determine a background pixel value for the segment and a character pixel value for the segment. For example, if the ideal background is white with a value of 1, the pixel values on the background side of the edge might return values in the range of 0.4 to 0.8. Similarly, the pixel values on the text side might return values near 0.0. Accordingly, the system can determine that the background value is a maximum value (e.g., 0.9) (or average value, weighted value, etc.) of those pixel values, and that the text value is around 0.0. Thus, a threshold of 0.5 might not be sufficient to separate text from background regions. In this example, the algorithm can set the threshold at a percentage of the difference between the values. In some embodiments, the algorithm might set the threshold at the halfway point between the extremes, here setting a color value of around 0.4. In embodiments where the system would like to be conservative and exclude less data as background, the threshold can be set higher, and vice versa. Each pixel of a segment including an edge region can then be analyzed, and pixels can be designated as text or background pixel depending on whether the corresponding pixel values each meet, exceed, or are less than the segment threshold (depending on factors such as the color scale, etc.).

Segmentation works on the assumption that lighting and other such aspects will be more uniform on smaller regions of an image. The size of a segment or pixel neighborhood has to be large enough, however, to cover a sufficient range of foreground and background pixels, otherwise a poor threshold value might be chosen. On the other hand, choosing regions which are too large can limit the ability of the process to adequately account for variations, where a large region might include significant variation.

Figure 7A:
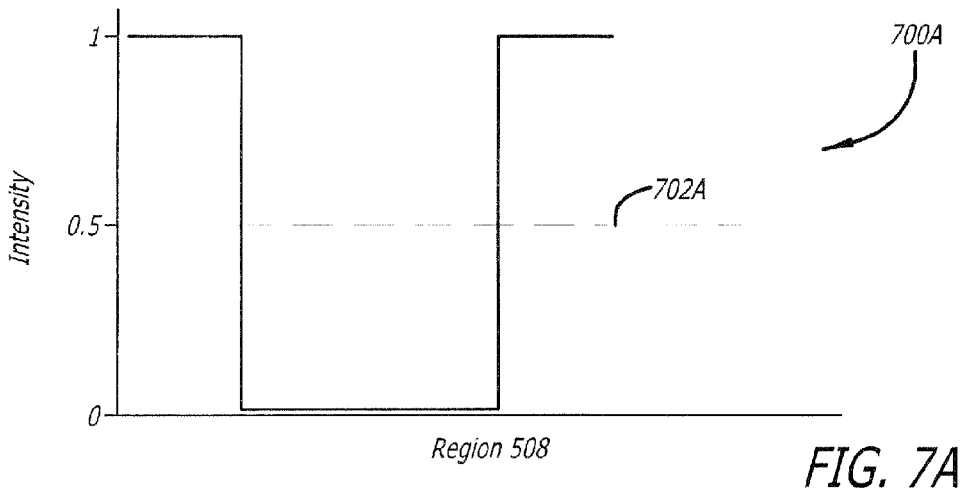
FIGS. 7A, 7B, and 7C illustrate example distance versus gradient intensity graphs, in accordance with various embodiments.
Figure 7B:
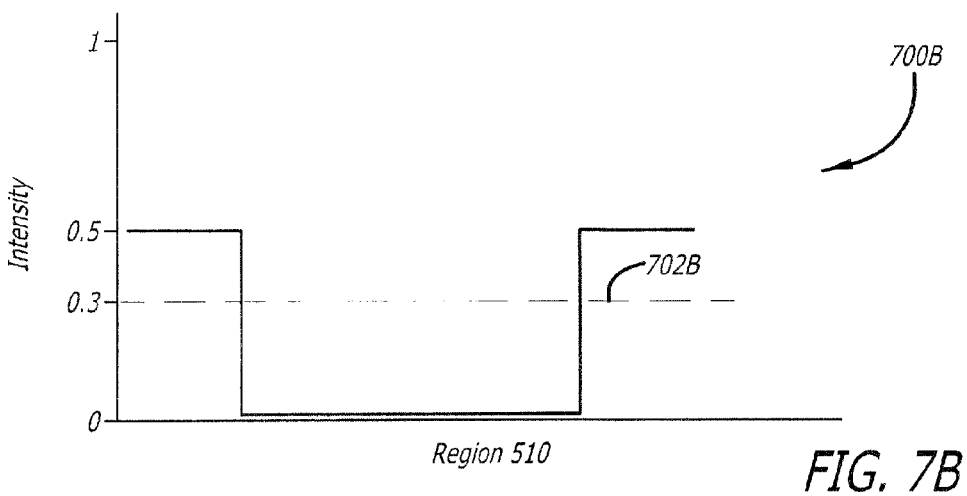
Figure 7C:
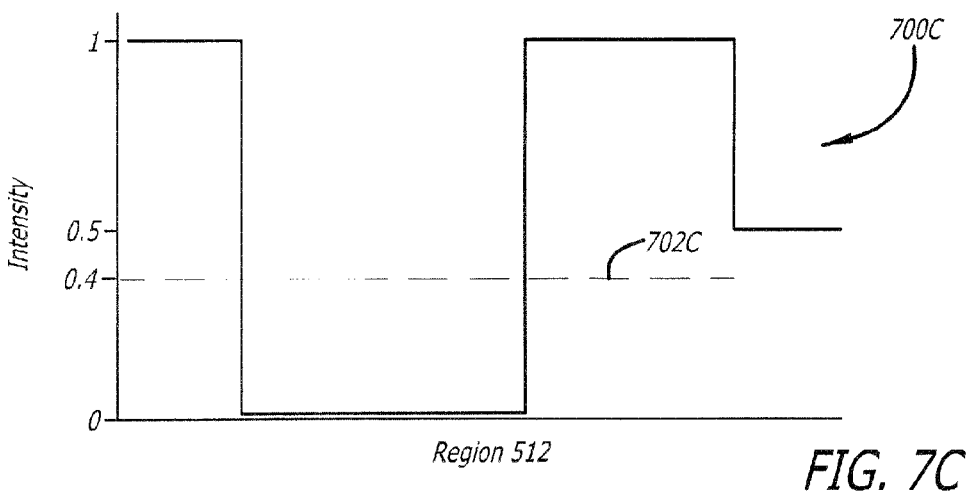

FIGS. 7A, 7B, and 7C illustrate example pixel values that can be obtained for a scan line, pixel row, or other such cross-section through different image segments that can be generated in accordance with various embodiments. In various embodiments, a pixel value refers to a grayscale pixel intensity value, a color pixel intensity value, a pixel saturation value, a pixel saturation level, and the like. Each pixel that represents an image stored in a computer has a pixel value which describes how bright that pixel is, and/or what color a pixel should be. For a grayscale image, the pixel value is typically a single number that represents the brightness of the pixel. For example, a common pixel format is a byte image, where the pixel value number is stored as an 8-bit integer giving a range of possible values from 0 to 255. In this example, zero is taken to be black, 255 is taken to be white, and values in between make up the different shades of gray. FIG. 7A is an example distance versus intensity graph for a grayscale image that illustrates the change in intensity as measured by individual pixels going horizontally across region 508 of FIG. 5. Region 508, starting from the left and moving to the right (as denoted by a line in FIG. 5), starts with a high intensity white pixel region, for example, and ends with a low intensity dark or black pixel region that corresponds to a portion of a character. For simplicity, the range of possible pixel values for the following examples will be represented by a value from 0 to 1. Referring to graph of 700A, the intensity of the white pixel regions could be substantially near completely illuminated and will be denoted with a value of 1.0. Moving further across the region 508 to the right, there is eventually a sharp drop in intensity corresponding to a level near 0.0. In this example, a threshold value 702A of 0.5 could be chosen such that anything above an intensity of 0.5 is considered part of the image background and anything below 0.5 is considered part of an object of interest that could be text.

Referring now to FIG. 7B that corresponds to the region 510 of FIG. 5. In this example, the far left side of the region 510 starts in the shadow region 504, which is relatively higher than the text region at the far right end, but because of the shadow region, the intensity is not initially as high compared to the initial intensity described with respect to FIG. 7A. Referring to graph 700B, the intensity of the lighter pixel region is lower in intensity due to the region's proximity to the shadow region 504, which gives it an initial value of 0.5. Moving across the region 510 to the right, there is eventually a sharp drop in intensity corresponding to a value near 0.0. In this example, a threshold value 702B of 0.3 could be chosen such that anything above an intensity of 0.3 is considered part of the image background and anything below 0.3 is considered part of an object of interest that could be text. The threshold value is therefore lowered relative to that of region 508 as a result of lower relative changes in pixel intensities.

FIG. 7C graphically illustrates the change in intensity as measured by individual pixels moving horizontally across region 512 of FIG. 5. In this example, graph 700C shows an initial intensity value of 1.0 since the region 512 and, moving across region 512 to the right, there is once again a sharp drop in intensity corresponding to an intensity value near 0.0. Continuing along to the right, there is another jump upward in intensity on the other side of the character area resulting in an intensity value of about 1.0 again. The intensity once again drops off moving to the right side of region 512 when the line reaches the shadow region 504 as illustrated in FIG. 7C. In this example, a threshold 702C having an intensity value of 0.4 is chosen because there is still a significant enough contrast between the illuminated areas and the darker character area. It should be noted that if global thresholding had been applied to the example of FIG. 5 and, for example, a threshold of 0.5 had been chosen for the entire image portion, the regions on the right side of the image, including region 512, would have been filtered to a 0.0 value. Utilizing an adaptive thresholding technique, however, enabled the correct identification of the character and background regions.

FIG. 8 illustrates an example process 800 for providing text data to a text recognition algorithm or engine that can be used in accordance with various embodiments. It should be understood that, for any process discussed herein, there can be additional, fewer, or alternative steps performed in similar or alternative orders, or in parallel, within the scope of the various embodiments unless otherwise stated. In this example, an image captured by a camera of a portable computing device is obtained 802. In at least some embodiments, the image can be converted to a grayscale image, and other such pre-processing can be performed as known in the art for text recognition and other such purposes. The image intensity gradients of a plurality of regions in the image are analyzed to identify a set of edge locations 804. Taking an edge to be a change in intensity taking place over a number of pixels, the edge detection algorithm can determine the edge by calculating a derivative of this intensity change, for example, and selecting regions where the calculated value meets or exceeds an edge selection threshold. Pixel values adjacent, or within a determined distance from, each of the set of edge locations are analyzed 806. Relative pixel values for character portions and background portions of the image for at least a portion of the plurality of regions are determined 808. Based at least in part on the relative pixel values, a character threshold (or background threshold) for at least a portion of the plurality of regions is determined 810. Character regions based at least in part upon pixels having a pixel value at least meeting the threshold for a respective pixel are then determined 812.

After potential character regions are determined using the adaptive local thresholds, the regions can be assembled into a plurality of connected components using a connected component algorithm. The connected components can be pixels connected on the basis of, for example, pixel intensity and predefined distance between the pixels of interest. Thus, a segment that includes a small mark or blemish within that region would likely not be connected with edges in an adjacent region as the mark is not contiguous with pixels in other regions having similar intensity or color values. A connected component algorithm, or other such process, can also analyze the connected components, once determined, in order to determine whether each connected component satisfies at least one character constraint. The constraints can include information such as shape and dimension, and can be based at least in part on properties of the neighboring text. It can be assumed that neighboring text characters share certain properties, such as relatively consistent spacing between such characters, similar aspect ratios, and similar vertical and horizontal alignment, among others. The shared properties can be checked, for example, by determining whether the centroids (or top or bottom of each character) of adjacent connected components are approximately along the same line, whether the height and width of the adjacent characters fall within a specified range of ratios among them, and whether the spacing between characters is substantially similar. The parameters used for making these decisions are, or can be, determined empirically. Based on the properties and techniques just described, the connected components algorithm can also approximately determine the shape, connection orientation, and line direction of text in an image that isn't taken from the front the image or that is diagonal across the image.

FIG. 9 illustrates an example image portion 900 of multiple lines of text captured diagonally across the image 900. The image portion 900 again corresponds to a portion of the Good Food Cafe URL illustrated in FIG. 3. In this example, the top line of text 904 reads "Good Food Cafe" and the second line of text 908 reads "www.goodfood.com" 902. In this example, the algorithm can determine centroid locations of each connected component, and can analyze the relative position and spacing of those centroids to determine the likely orientation of text in the image portion. For example, the centroids (represented in the figure as dots) of adjacent connected components can be considered to sit along the same line when a line can be fit through those points within a determined amount of deviation, and where the spacing of points along that fit line is consistent within an allowable amount of deviation. It should be understood, however, that points at the tops or bottoms of the characters can be determined and used instead of, or with, centroid points in other embodiments. Certain letter combinations might work better with different point locations, such that different points can be used and determined when sufficient results cannot otherwise be obtained.

In this example, the string of text or characters for "Good Food Cafe" roughly line up about centroid average line 906 and the string for "www.goodfood.com" 902 roughly line up about centroid average line 908. A text line construction algorithm can be implemented to determine a text direction and whether which components are along the same line. Based on the presence of more centroid points diagonally about the centroid average lines 906 and 908, the algorithm could know to ignore a hypothetical line running though the two centroid points of the first "o" of "Good" and the second "w" of the URL that are, more or less, horizontal, for example.

Additionally, to allow for the breaking up of a character into two or more connected components, an additional check can be made to determine multiple components that can be treated as a single unit to satisfy the above constraints. Components that do not satisfy at least one of the character constraints are removed. Since it is assumed that characters must be close to and similar to other nearby characters with which to form a word, components that do not satisfy at least one of the constraints, such as long straight lines and rectangles as well as intersecting lines and boxes, are removed. The removal of intersecting lines and boxes is based on the idea that the long straight lines, rectangles, and intersecting lines and boxes do not correspond to text. Additionally, connectivity algorithms can be applied to approximately determine the shape of the text present in the image.

Once connected components are isolated, a stroke width transform (SWT) algorithm or other such process can be applied to attempt to segment out likely regions of text from an image in order to clean the input of an optical character reader. The algorithm can transform the image data from containing values per pixel to containing the most likely stroke width, the result of which is able to detect text regardless of its scale, direction, font, and language. One feature that separates text from other elements of a scene is its nearly constant stroke width. This can be utilized to accurately identify regions that are likely to contain text. Subsequently, the character regions are analyzed using an optical character recognition algorithm to recognize the filtered and processed text in the character regions. An advantage of providing text location and alignment data to the SWT (or other such) algorithm is that the data provides a starting point for the process, thus improving the speed and accuracy of the process.

In various embodiments, multiple images of an object can be analyzed to compensate for image imperfections, such noise, blur, and other such variations. This technique is used based on the assumption that statistically, noise, blur, and various lighting variations are not consistent over multiple image frames and that these imperfections can be easily discarded or filtered out and therefore increasing image processing efficiency. In some embodiments, the set of images will be analyzed and then the results processed to determine the most likely input. In other embodiments, the images can be analyzed one at a time until acceptable results are determined, after which time the images can be discarded. Various other approaches can be used as well within the scope of the various embodiments.

In various embodiments, as described above with respect to FIGS. 2A-2C, the function or application could involve dialing a number when the text pattern indicates a phone number or opening an address book for saving contact information when the text pattern indicates a presence of a phone number and a physical address. The application could be navigating to a URL when the text pattern indicates a web address as described in FIG. 3A-3C. The application could display a map to show an address when the text pattern indicates a physical address as described in FIG. 1A-1C. The function or application could also be performing various language translations. The application could also be a calculator, have the ability to solve math equations, or be associated with a plug-in for identifying features of a bill for calculating tips or splitting a bill multiple ways when eating at a restaurant with friends. In one embodiment, a user could be prompted to choose between a primary action and at least a secondary action associated with the particular data object. Referring back to the business card example, the predetermined primary action associated with the recognition of a business card could be to save the information thereon as a new contact in an address book application. A secondary action could be to call the phone number on the card, and a tertiary action could be to look up directions to the address.

In one embodiment, a system or service in communication with the portable computing device of many embodiments can monitor a user's activity over time to adjust an action performed by the application. For example, if a user always chooses to call a number on a business card and never chooses to save the contact, the device could adjust the algorithm to automatically call or prompt the user to call the number first. This example can also be extended to other data types. In other embodiments, the device could be preloaded with various behavior-predicting algorithms or intent-ware to predict a user's intent in various situations. For example, the device could include a user facing camera, gyroscope, accelerometer, light sensor, or combination thereof. The user facing camera could use facial recognition and gesture tracking algorithms to determine a user's gazing direction. A light sensor could determine the likely hood of being in a user's purse or pocket. In this example, the device may go into an energy saving mode and refrain from capturing or processing images until a sufficient amount of light is detected by the sensor. The gyroscope and accelerometer could be used to detect how the user is holding and moving the device. In some instances, a user makes a predictable motion or holds the device in a particular manner that is indicative of taking or capturing an image. In one example, a gyroscope and accelerometer registering movement may again place the device in an energy saving mode. In this example, capturing a decent image would be difficult and the device could be programmed to reasonably infer that these are not normal image capturing conditions. Various other methods or predicting a user intent may also be utilized within the scope of the present disclosure.

Various embodiments utilize image preprocessing algorithms and/or techniques to standardize text for identification and/or recognition. Text in the real world comes in many colors, shapes, font types that can be skewed, blurry, of different sizes, and the like. Machine vision image processing techniques can be utilized and which can include thresholding (converting a grayscale image to black and white, or using separation based on a grayscale value), segmentation, blob extraction, pattern recognition, barcode and data matrix code reading, gauging (measuring object dimensions), positioning, edge detection, color analysis, filtering (e.g. morphological filtering) and template matching (finding, matching, and/or counting specific patterns). Various other techniques for processing text to be more easily recognizable by an OCR may also be utilized within the scope of this disclosure.

FIGS. 10A and 10B illustrate front and back views of an example portable computing device 1000 that can be used in accordance with various embodiments. Although one type of portable computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and portable media players, among others.

In this example, the portable computing device 1000 has a display screen 1002 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material 1010 on other areas of the device as well, such as on the sides or back of the device. While in at least some embodiments a user can provide input by touching or squeezing such a material, in other embodiments the material can be used to detect motion of the device through movement of a patterned surface with respect to the material.

The example portable computing device can include one or more image capture elements for purposes such as conventional image and/or video capture. As discussed elsewhere herein, the image capture elements can also be used for purposes such as to determine motion and receive gesture input. While the portable computing device in this example includes one image capture element 1004a on the "front" of the device and one image capture element 1004b on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology.

The portable computing device can also include at least one microphone 1006 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 1000 in this example also includes at least one motion- or position-determining element 1008 operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 1014, such as may include at least one wired or wireless component operable to communicate with one or more portable computing devices. The device also includes a power system 1016, such as may include a battery operable to be recharged through conventional plug-in approaches, or through other approaches such as capacitive charging through proximity with a power mat or other such device. Various other elements and/or combinations are possible as well within the scope of various embodiments.

In order to provide functionality such as that described with respect to FIGS. 10A and 10B, FIG. 11 illustrates an example set of basic components of a portable computing device 1100, such as the device 1000 described with respect to FIGS. 10A and 10B. In this example, the device includes at least one processor 1102 for executing instructions that can be stored in at least one memory device or element 1104. As would be apparent to one of ordinary skill in the art, the device can include many types of memory, data storage or computer-readable storage media, such as a first data storage for program instructions for execution by the processor 1102, the same or separate storage can be used for images or data, a removable storage memory can be available for sharing information with other devices, etc.

The device typically will include some type of display element 1106, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 1108, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element also can be used to determine the surroundings of the device, as discussed herein. An image capture element can include any appropriate technology, such as a CCD image capture element having a sufficient resolution, focal range and viewable area, to capture an image of the user when the user is operating the device.

The device, in many embodiments, will include at least one audio element 1110, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device.

The device can include at least one additional input device 1112 that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 1114 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 1116 known in the art for providing power to an portable computing device, which can include capacitive charging elements for use with a power pad or similar device as discussed elsewhere herein. The example device also can include at least one touch- and/or pressure-sensitive element 1118, such as a touch sensitive material around a casing of the device, at least one region capable of providing squeezebased input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes. Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 12:
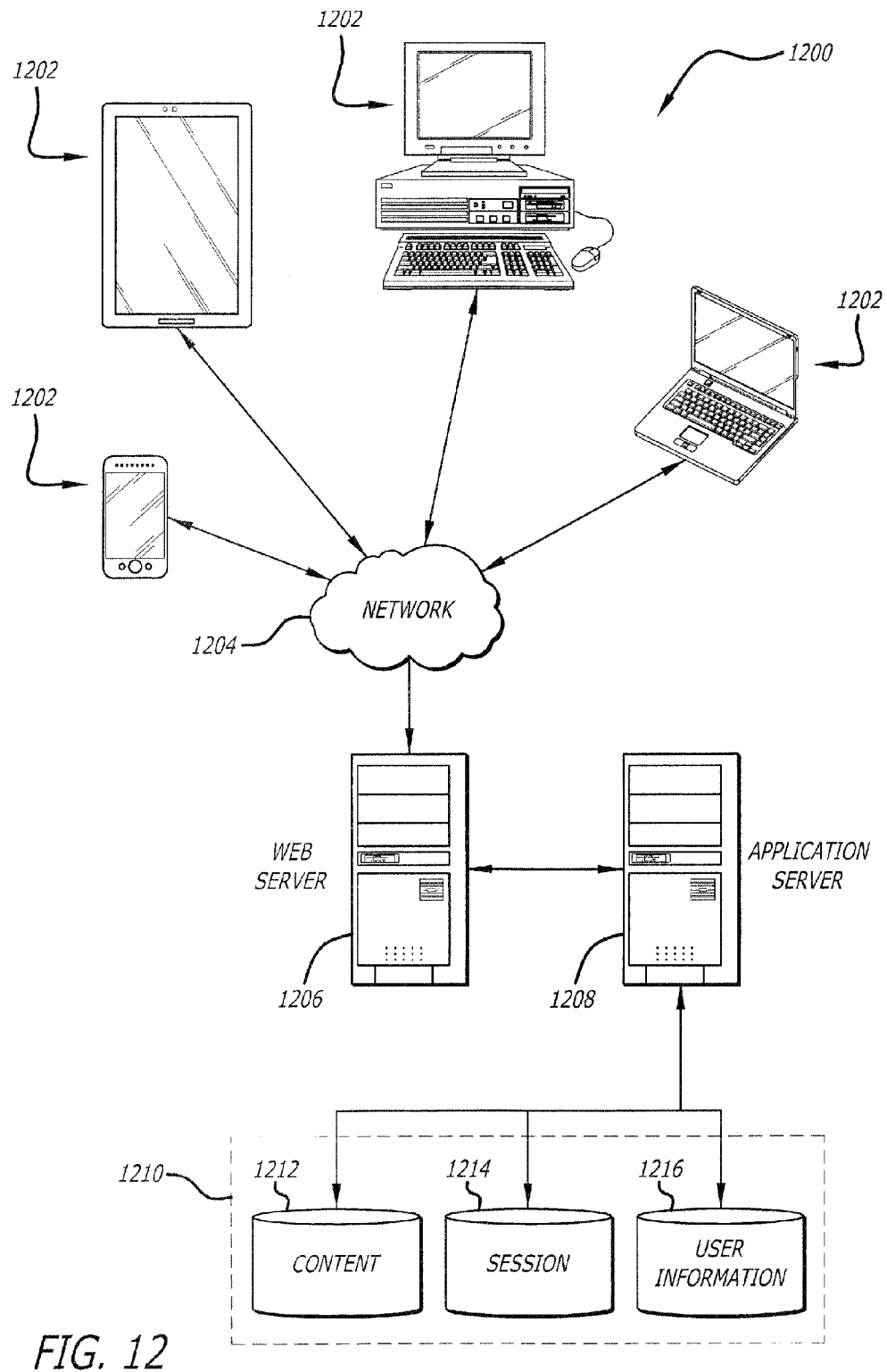
FIG. 12 illustrates an example environment in which various embodiments can be implemented.

As discussed, different approaches can be implemented in various environments in accordance with the described embodiments. For example, FIG. 12 illustrates an example of an environment 1200 for implementing aspects in accordance with various embodiments. As will be appreciated, although a Web-based environment is used for purposes of explanation, different environments may be used, as appropriate, to implement various embodiments. The system includes an electronic client device 1202, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1206 for receiving requests and serving content in response thereto, although for other networks, an alternative device serving a similar purpose could be used, as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1208 can include any appropriate hardware and software for integrating with the data store 1210 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1206 in the form of HTML, XML or another appropriate structured language in this example. The handling of all requests and responses, as well as the delivery of content between the client device 1202 and the application server 1208, can be handled by the Web server 1206. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing content (e.g., production data) 1212 and user information 1216, which can be used to serve content for the production side. The data store is also shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
    obtaining at least one image of information associated with an event captured by a camera of a portable computing device;
    analyzing the at least one image to locate a region of the image having visual properties identifying the event;
    processing the region using an optical recognition algorithm to identify the event based on the visual properties;
    determining at least one action available to a user, the at least one action being related to the event; and
    causing the portable computing device to execute the at least one action related to the event.

2. The computer-implemented method of claim 1, wherein an application on the portable computing device executes the at least one action related to the event, the application being at least one of a web browser and the action being associated with navigating to a webpage associated with the event when the visual properties indicate a web address or a map application and the action being associated with displaying location information for the event when the visual properties indicate a physical address.

3. The computer-implemented method of claim 1, wherein analyzing the at least one image includes:
    analyzing pixel values adjacent one or more potential edge locations;
    determining, based at least in part on the pixel values, a character pixel value threshold;
    determining a set of pixels having a pixel value at least meeting the character pixel value threshold; and
    assigning the set of pixels as a character portion.

4. The computer-implemented method of claim 3, wherein analyzing the pixel values includes analyzing a first set of pixels on a first side of each potential edge location and analyzing a second set of pixels on a second side of each potential edge location.

5. A computer-implemented method comprising:
    under control of one or more computer systems configured with executable instructions,
        obtaining image information using a camera of a computing device;
        identifying an event associated with the image information;
        analyzing text associated with the event using at least one of a computer vision algorithm or an optical character recognition algorithm to identify the text in the image information;
        determining at least one action available to a user, the action being related to the event; and
        causing the computing device to perform the at least one action related to the event.

6. The computer-implemented method of claim 5, wherein the at least one action is at least one of dialing a phone number, opening an email application for composing an email, navigating to a URL for the event, or displaying a map to show an address associated with the event.

7. The computer-implemented method of claim 5, further comprising:
capturing, using the camera, the image information of an advertisement of the event, the image information being captured automatically in response to the camera being focused on the advertisement, in response to a user input, or combination thereof.

8. The computer-implemented method of claim 7, further comprising:
identifying text in the image information of the advertisement; and
determining a pattern associated with at least one of a pattern indicative of a telephone number for event information, a pattern indicative of an email address associated with the event, a pattern indicative of a URL, or a pattern indicative of a street address.

9. The computer-implemented method of claim 5, further comprising:
analyzing, for each of a plurality of regions, the image information to determine a character pixel value threshold.

10. The computer-implemented method of claim 9, wherein analyzing the image information includes:
analyzing first pixels on a first side of an edge location; and
analyzing second pixels on a second side of the edge location to determine the character pixel value threshold.

11. The computer-implemented method of claim 5, wherein identifying the event includes recognizing text in the image information by at least:
identifying, in the image information, an edge location;
determining a character pixel value threshold based at least in part on pixel values associated with the edge location; and
determining a text character portion based at least in part on a pixel value at least meeting the character pixel value threshold.

12. The computer-implemented method of claim 11, further comprising:
determining the edge location based at least in part on a change in pixel intensity or saturation corresponding to a value at least meeting the character pixel value threshold.

13. The computer-implemented method of claim 11, further comprising:
analyzing first pixels on a first side of an edge location; and
analyzing second pixels on a second side of the edge location to identify the at least one edge location.

14. The computer-implemented method of claim 5, further comprising:
prompting a user to confirm intent to perform the at least one function.

15. A computing device, comprising:
a processor; and
a memory device including instructions that, when executed by the processor, cause the processor to:
obtain at least one image of an advertisement associated with an event, the at least one image being captured by a camera of the computing device;
process the at least one image of the advertisement to locate at least one region having properties of text;
analyze the at least one region using an optical character recognition algorithm to recognize the text associated with the event;
identify a text pattern corresponding to the recognized text;
determine an application associated with the text pattern; and
cause the recognized text to be sent to the application for performing an action with the text pattern associated with the event.

16. The computing device of claim 15, wherein the text pattern includes at least one of a pattern indicative of a telephone number for information associated with the event, a pattern indicative of an email address associated with the event, a pattern indicative of a URL associated with the event, or a pattern indicative of a street address for the event.

17. The computing device of claim 15, wherein the instructions that, when executed by the processor, further cause the processor to:
analyze the at least one image to identify a character pixel value threshold for each of a plurality of regions of the at least one image.

18. The computing device of claim 17, further comprising:
analyze first pixels on a first side of an edge location; and
analyze second pixels on a second side of the edge location to determine a background pixel value.

19. The computing device of claim 15, wherein the action is at least one of dialing an event phone number in response to the recognized text indicating a phone number, opening an email application for composing an email in response to the recognized text indicating an email, navigating to a URL for the event in response to the recognized text indicates a web address, or displaying a map to show an address for the event in response to the recognized text indicating a physical address.

* * * * *